United States Patent [19]

Kindt et al.

[11] Patent Number: 4,829,107

[45] Date of Patent: May 9, 1989

[54] RICE HULL ASH CONCRETE ADMIXTURE

[75] Inventors: Lawrence J. Kindt, Woodbine; Ellis M. Gartner, Silver Spring, both of Md.

[73] Assignee: W. R. Grace & Co.-Conn., New York, N.Y.

[21] Appl. No.: 159,978

[22] Filed: Feb. 24, 1988

[51] Int. Cl.$^4$ ................................................ C08K 3/36
[52] U.S. Cl. .......................................... 524/3; 524/15; 524/492; 106/98; 106/123.1; 106/406
[58] Field of Search ............... 524/15, 3, 492; 106/98, 106/288 B, 123.1

[56] References Cited

U.S. PATENT DOCUMENTS 4,105,459  8/1978  Mehta ..................................... 106/98
4,623,682 11/1986  Nicholson et al. ..................... 524/3

OTHER PUBLICATIONS

Rice: Chemistry and Technology, B. O. Juliano.
Properties of Blended Cements Made from Rice Husk Ash, by P. K. Mehta, J. Am. Concr. Inst. 74(9):440–442, (1977).
Cement Replacement Materials, Rice Husk Ash, Chapter 6, by D. J. Cook, Surrey Press (1986).
Use of Rice Husk Ash in Concrete, by M. N. Al-Khalaf and Hana A. Yousif, Int. J. Cement Comp. and Lightweight Concrete, 6 241–248 (1984).

*Primary Examiner*—Lewis T. Jacobs
*Attorney, Agent, or Firm*—Howard J. Troffkin

[57] ABSTRACT

A cement admixture and cement composition containing said admixture comprising finely ground rice hull ash formed by slurry grinding of said ash to a volume medium particle diameter or up to 4 micrometers.

20 Claims, No Drawings

RICE HULL ASH CONCRETE ADMIXTURE

BACKGROUND OF THE INVENTION

The present invention relates to a novel rice hull ash of ultra high fineness and other particular properties, as described fully hereinbelow, aqueous slurries of said ash and to their use as an admixture for hydraulic cement to enhance the properties of hydraulic cement compositions and the resultant set products made therewith.

Rice hull materials, such as the shell, hull or husk of the rice grain, are generally a discarded waste product from rice production. The rice hull materials are viewed as having little, if any, commercial value in their raw material form. It is known, however, that rice hull materials typically contain a substantial amount, typically about 16 to 20 percent, of silica ($SiO_2$) and when burned yield an ash which is rich in amorphous silica. This ash, referred to herein and in the appended claims, as "rice hull ash" or "RHA", has been used as a pozzolanic additive in hydraulic cement compositions. The RHA is viewed as a filler material capable of replacing or extending the more expensive ingredients of the composition, such as portland cement and the like. (See U.S. Pat. No. 4,105,459 to P. K. Mehta.) The RHA material has also been proposed as a filler or extender in other applications, such as in elastomeric and plastimeric compositions (see U.S. Pat. No. 3,951,907 to P. K. Mehta). Its use in these general manners have value in countries where rice is a major crop and where the other components which are replaced or extended are expensive and/or not readily available.

The rice hull material is commonly converted into RHA by uncontrolled combustion methods in which the material is used as the fuel source. More recently, U.S. Pat. No. 3,959,007 disclosed a process in which a higher amount of energy is obtained when burning rice hull material under controlled combustion while still obtaining a RHA useful as a cement pozzolan or as an extender in other applications. The ash obtained from conventional modes of combustion may be further processed by dry grinding the ash to a powder form. The resultant ground material is a fluffy powder of low bulk density having a BET surface area of about 10 sq. m./g. or greater and, typically, a Blaine specific surface area of lower than 1 sq.m./gm. (The higher the Blaine value the smaller the particle.) Although the BET specific surface area of RHA preparations increases as the combustion temperature is reduced, and can be in excess of 200 sq.m./g., the Blaine specific surface areas of RHA's are usually much lower than this, typically less than 1 sq.m./g. This difference is because most of the specific surface measured by the BET technique is internal to the particle while the internal surfaces of a particle are not measured by the Blaine technique. The Blaine specific surface area measurements are greatly affected by particle size changes and are more indicative of particle size. Thus, the RHA material presently obtained and used is a somewhat coarse particle, having a low bulk density which makes the RHA hard to handle and deliver in desired amounts into a mix.

In the case where RHA is viewed predominantly as an extender-filler, the particle size of the RHA is not deemed to be critical as long as it is not so large as to disrupt the matrix to which it is added. In the case of its use as a pozzolan in cement compositions, it is known that small increases in the strength of the resultant hardened cement composition can be achieved by the use of smaller particle size RHA. However, this relationship tends to plateau as the particle size reaches a Blaine surface area of 1 to 1.5 sq. m/g. Therefore, there has been no incentive to attempt to develop a means to further reduce the RHA particle size and achieve a resultant product.

In summary, rice hull ash (RHA) is generally of high silica content (at least about 85% $SiO_2$), but its usefulness as an additive in hydraulic cement mixes has heretofore been limited by the difficulty in obtaining it and handling it in a controlled, convenient and efficient manner. It has been demonstrated that the pozzolanic reactivity of RHA may be enhanced by burning the rice hulls at relatively low temperatures in specially-designed furnaces (U.S. Pat. No. 3,959,007). The strength of hardened hydraulic cements can be enhanced to small extents by using smaller particle RHA but this relationship plateaus. Because of this as well as the mechanical restrictions in dry grinding and the required need of specialized combustion techniques, there has been no desire to produce a RHA of very high Blaine value. Additional barriers to the need to form and use a high-Blaine RHA are the difficulty believed associated with handling the ultrafine dry powder, its presumed poor flow properties and with its dust hazards.

SUMMARY

The present invention is directed to RHA of ultra high fineness as more specifically defined hereinbelow. The present invention is further directed to cement admixture compositions containing said RHA of this invention which provides for a means of easily handling and metering the ultra high fineness RHA and to improved cement compositions containing said admixture.

The present invention has been found to be an effective means of causing the resultant cement structures to exhibit substantial inhibition to permeation of materials which adversely affect the durability of the resultant structure, such as chloride ions and the like and thus form a structure of high strength and low corrosion potential.

DETAILED DESCRIPTION OF THE INVENTION

The present invention relates to a rice hull ash product of ultra fine particle size, to stable and easily handle aqueous suspensions containing said rice hull ash and to hydraulic cement compositions to which the present rice hull ash has been added.

In order to provide a clear description of the present invention, the following terms are used in this description and in the appended claims with the meaning given below.

The term "hydraulic cement" refers to a dry powder which sets and hardens to a solid mass when mixed with water. Among the cements included under this definition are plaster of paris, high alumina cements, lime-pozzolan cements, blastfurnace slag cements, portland cements, and blended cements based principally on portland cement. The term "hydraulic cement composition" is taken to refer to a mixture of an hydraulic cement with water, and also, if desired, with aggregate and admixtures. The term "aggregate" refers to an essentially chemically inert filler, such as a sand or gravel or crushed rock, whereas the term "admixture" refers to materials which when added to a cement composition in small amounts imparts a large influence on the physical and/or chemical properties of the uncured composition and/or upon the cured composition. Hydraulic cement compositions include a cement paste when there is no aggregate, a mortar when the aggregate is a sand, and a concrete when the aggregate also contains coarse particles such as gravel or crushed rock.

A "pozzolan" is an inorganic material which consists principally of chemically reactive compounds of silicon and aluminum in their oxide forms, and which is capable of reacting with lime (calcium hydroxide, $Ca(OH)_2$), to form a hardened mass of calcium silicate hydrates and calcium aluminate hydrates. A common application is to use pozzolans as additives to enhance the economy or modify the properties of mixed based primarily on portland cements. In such cases, the pozzolans react with the lime evolved by the normal reaction between cement and water. In some cases the pozzolan is interground or interblended with the dry solids during the manufacture of the portland cement, while in other cases, pozzolans are added as an admixture during the preparation of portland cement compositions, such as concretes.

The terms "rice hull ash" and "RHA" refer to the ash obtained from the combustion of rice hull materials, that is from the shell, hull and/or husk of the rice grain. Rice hull material is generally viewed as a waste product of little or no commercial value ("Rice: Chemistry and Technology" 2nd Ed. Chapter 19, by B. O. Juliano, 1985).

The terms "rice hull ash product," "RHA product," "RHA-LT product" and "RHA-PF product" refer to the product of the present invention, as fully described below, which is formed from conventional RHA. The present invention is directed to a new rice hull ash product, aqueous suspensions of this product and to its use as a hydraulic cement admixture. The rice hull ash used to form the RHA product of the present invention must be an amorphous silica formed by the combustion of rice hull. The combustion can be accomplished by various modes, such as by the controlled slow combustion of rice hulls at low to moderate temperatures, preferably below 800° C. and more commonly between about 500° and 600° C. Such a combustion process is described in U.S. Pat. No. 3,959,007, the teaching of which is incorporated herein by reference, or by other known low temperature processes. The rice hull ash produced by such low temperature modes of combustion is herein referred to as "RHA-LT." When the combustion period is maintained for an extended period the RHA-LT may be light gray or off-white in color while short combustion periods tend to yield a darker gray to black material. Material formed under such low temperature combustion has high internal porosity as shown by its high BET specific surface area values which are typically in the range of about 20 to 200, more typically about 100 to 200 sq.m./g. and greater. Higher values are obtained by the lower combustion temperature. Alternately, the rice hull ash useful in forming the present RHA product can be formed by combustion of rice hull material in a conventional pulverized fuel burner. The rice hulls, chopped to an average particle size of from about 0.1 to about 1 mm, are blown into a flame along with the combustion air. The combustion, although reaching temperatures well in excess of 1000° C., occurs over a very short time period. Materials formed in this manner have BET surface area values of about 20 to 50 sq.m./g. and are identified herein as "RHA-PF." The use of a pulverized fuel burner as the combustion means is a simple method of manufacturing the needed and useful RHA, because the technology for pulverized fuel combustion is well established and is also well suited to the use of the combustion heat for steam or electricity generation.

The RHA found useful in forming the RHA-product of the present invention must have a silica ($SiO_2$) content of at least 80% by weight and preferably at least 85% and most preferably at least 90% by weight. It should consist primarily of amorphous silica as determined by x-ray diffractometry. The formation of RHA under high temperature for extended periods results in crystallization of the silica dto cristobalite or quartz. Such RHA is not useful. The carbon content should be less than 10% and more preferably less than 6% by weight. Therefore, an amorphous silica RHA having at least 80% by wt. $SiO_2$ and less than 10% by wt. carbon is suitable but the preferred RHA would contain at least 85% by wt. $SiO_2$ and less than 6% by wt. carbon. The BET specific surface area should be at least 20 sq.m./g. and normally will range from 20 sq.m./g. to 200 sq.m./g. Higher values are useful.

The particle size of RHA which is ground by conventional means of dry processes normally has a Blaine specific surface area of less than 1 sq.m/gm. with the value rising as high as about 1.5 sq.m./g. By excessive dry grinding a Blaine specific surface area value of about 2 sq.m./g. may be achievable. Values in excess of about 2 sq. m./g. are not achievable by conventional means of dry grinding. The Blaine specific surface areas of RHA's are usually much lower than the BET values for the same material because most of the specific surface measured by the BET technique is internal to the particle, in the form of fine pores, which are not measured by the Blaine technique. Thus, the BET specific surface area is not significantly increased by further grinding RHA preparations, whereas the Blaine specific surface area is very amenable to increase by grinding up to the limitations discussed above.

The RHA-product of the present invention is required to have all of the physical characteristics described above for RHA, that is the characteristics of morphology, carbon and silica content, and BET surface area except that its particle size must be significantly smaller than previously taught. It has been unexpectedly found that by processing such RHA by the manner described below one can achieve a product of ultra high fineness, that is the particle diameter is ultra small. The ultra-small dimensions of the particles of the present RHA-product is of values that can not be accurately measured by conventional Blaine surface area measurements. An appropriate means of measuring the present ultra-fine particle size is by a laser-light scattering analyzer which gives a statistical analysis of the volume-median particle diameter ($D_{50}$). The present RHA-product must have a volume-median particle diameter ($D_{50}$) of up to 4 micrometers, preferably up to about 3 micrometers and most preferably up to about 2.5 micrometers. Because of the systematic differences among the various analytical techniques for determining size with the presently required ultra-high fineness product, the laser-light scattering analysis is the basis used here. Specifically, a Leeds and Northrup "Microtrac" laser-light scattering analyzer or its equivalent was used. The Blaine air permeability method of specific surface area determination, which is commonly used in the measurement of the fineness of cements and even of microsilicas, is not recommended herein because it is an imprecise means of analyzing materials of ultra-small particle size especially if the particles are also very non-spherical and internally porous, as is the case with RHA. For example, a sample of presently formed RHA, which was determined to have a $D_{50}$ of 3.7 micrometers by a laser-light scattering analyzer, was also found to have a Blaine air permeability specific surface area of 4.5 sq.m./g. Using this Blaine value and assuming that all of the particles were uniformly-sized spheres, a calculated diameter of only about 0.6 micrometers would be obtained. Knowing that the laser technique directly measures particle diameter, one readily observes that the Blaine technique is inappropriate for the present ultra fine product.

The process required to achieve the RHA-product of ultra-high fineness is to grind RHA by wet grinding technique. The liquid medium should be water. The water should contain or have introduced therein at least one low or high range water reducing agent used in cement formulations to achieve a resultant stable slurry. The wet grinding can be accomplished by various means, such as a ball mill, tube mill, sand mill, or any type of stirred or vibrated media mill, operated either in batch or continuous mode. Use of stirred media mills, such as an Attritor Mill has been found to be particularly effective for ultrafine grinding of RHA to produce slurries of the subject invention. The wet grinding has been found to achieve the desired ultra fine particle sizes and also provides low operating costs, reduced dust emissions and reduced noise levels. Dry grinding does not achieve the present RHA-product of ultra-high fineness.

Although the resultant RHA-product may be dried and used in its powder form, it is preferable to maintain and use the RHA-product in aqueous suspension. The suspension shall contain the RHA-product in from about 20 to 80%, preferably from about 30 to 70% and most preferably from about 40 to 60% by weight. The RHA-product suspension must also contain small amounts of conventional water reducing agent cement admixture material, such as naphthalene sulfonate formaldehyde condensate, melamine sulfonate formaldehyde condensate, lignin sulfonates, polyacrylic acid and its alkali and alkaline earth metal salts as well as copolymers of the polyacrylate and the like. The term "polyacrylate" shall include polymers of acrylic acid, methacrylic acid as well as $C_1$-$C_3$ alkyl esters thereof which are water soluble by having a sufficient amount of metal salt therein. The copolymer may be mixtures of the polyacrylate monomeric units indicated above or with other olefinic monomeric units including ethylene, hydroxyalkyl acrylates and the like. The water reducing agent must be present in at least 0.01% by weight of solids contained in the suspension, with normal range of from 0.01 to 10%, preferably from 0.1 to 5%. The most preferred suspension contains a mixture of a naphthalene sulfonate formaldehyde condensate and a polyacrylate. It has been unexpectedly found that the present RHA-product provides a stable, non-setting and non-settling suspension even when used in high concentrations, such as greater than 40% by weight.

The solid RHA-product of the present invention must contain substantially uniformly mixed therewith a water reducing agent, as described above, in amounts given above for the solid, powder RHA-product composition.

In addition, other conventional cement admixture materials may be combined in the RHA-product suspension without causing detrimental effects such as solidifying, gelling or settling of the suspension. Other types of admixtures which have been found to be desirable to be incorporated into the present RHA-product suspension includes viscosifiers, such as polyhydroxyalkyl celluloses, polyvinyl alcohol, polyethylene oxide and the like; wetting agents such as vinsol resins, sulfonated organic compounds, polyethoxylated alkyl phenols and the like; and set retarders such as sugar derivatives, polycarboxylic acids, hydroxycarboxylic acids, phosphates, phosphonic acids, borates and the like; accelerators, such as chlorides, sulfates, formates and nitrates of alkali and alkaline earth metals, especially of calcium, sodium or potassium. Another class of accelerator which is very suitable for this application is the hydroxyalkylated amines, such as triethanolamine, and corrosion inhibitors such as alkali and alkaline earth metal nitrites.

The subject slurry can be used directly as a hydraulic cement admixture. The slurry of RHA-product is stable and storable and is a means of readily transporting and metering the desired amount of RHA-product without incurring the handling and health (breathing) hazards associated with dry powders of rice hull ash and other conventional pozzolans. In addition, because the present RHA-product is capable of being contained in the slurry in high concentrations, the water content of the slurry does not have an adverse effect on the water to cement ratio and on the physical properties of the resultant cement composition.

Another embodiment of the present invention relates to a particularly useful and unexpected observation that stable and pourable suspensions can be formed of a combination of highly desired materials. Specifically, when the subject RHA-product suspension, as described above, is formed from RHA described above as RHA-PF, one can include into the suspension high concentrations, such as up to about 10% by weight, and even up to about 15% by weight of the total suspension, of calcium nitrite. Calcium nitrite is a known agent which effectively inhibits corrosion of metal pieces (such as rebars and the like) contained in cement compositions when used in concentrations ranging from at least 0.5 to 10 percent and preferably of at least about 2 percent based on the portland cement contained therein. The present suspension permits the addition of the desired RHA-product and of sufficient calcium nitrite by a single application. Thus it alleviates on-site multiple application of admixture materials, and provides for accurate dosage of the desired materials. The ability to combine the present microsilica product with high concentrations of calcium nitrite to provide a storage stable, pourable suspension is unexpected as suspensions formed with other microsilicas, such as condensed silica fume, with calcium nitrite harden after only a few hours to unworkable consistency which can not be poured or metered. Thus, a particularly novel and useful form of this invention is suspensions containing from about 20 to 80% (preferably from 40% to 60%) RHA-PF, from about 0.5 to 10% (preferably from 2 to 8%) $Ca(NO_2)_2$, and 0.01 up to 5% (preferably, 0.1 to 5%) by dry weight of a water reducing agent, as described above, which is preferably selected from naphthalene sulfonate formaldehyde or melamine sulfonate formaldehyde condensates. This has exceptionally good properties as an economical durability enhancing admixture for use in reinforced portland cement mortars or concretes, since it acts both to reduce the permeability of the hardened concrete to aggressive species such as chloride or sulfate ions, and also to inhibit the onset of corrosion of reinforcing steel even if aggressive species, including carbon dioxide, penetrate through to the steel.

The RHA-product admixture slurry of the present invention can be added to conventional hydraulic cement compositions in amounts ranging from about 0.1 to 30, preferably to 20 percent solids of the slurry based on the dry cement used in the cement composition (S/S).

The following examples are set forth to further illustrate and describe the present invention, and are not meant to limit its scope in any way except as defined in the claims appended hereto. All parts and percentages are by weight unless otherwise indicated.

EXAMPLE 1

This example illustrates the production of RHA slurries by the wet-milling process. Rice hull ash of the RHA-PF class was purchased from Agrilectric Power Partners, Inc., of Lake Charles, La. They were waste byproducts of an electricity generation process. The samples had bulk densities of between 17 and 22 lb/cu.ft., silica contents of 92 to 93 wt.%, carbon contents of 2.5 to 5.5 wt.% and a moisture content of less than 2 wt. %, the remainder of the mass being principally in the form of calcium, potassium and magnesium oxide compounds. The median particle diameter was 65 um, as measured by laser-light scattering technique using a Microtrac (TM). The RHA was milled in a 3.4 gallon ceramic jar mill, with a grinding medium consisting of 23.3 kg of steel balls (¼ and ⅜ inch). The mill was of 12-inch internal diameter, and was rotated on rollers at 38 rpm. It was first charged with the steel balls plus 2250 g of an aqueous solution containing 110 g of sodium naphthalene sulfonate formaldehyde condensate (Daxad-19) sold by W. R. Grace & Co. Then 2750 g of RHA was added in three increments over a period of 3 hours, after which the mill was allowed to continue running for a further 16.5 hours. At the end of this period, the resulting RHA product slurry was withdrawn from the mill, and analyzed for particle size distribution using a Microtrac laser-light scattering analyzer. The mass median particle diameter was found to be 2.6 um. The slurry was a stable liquid with a total RHA solids content of 55% by weight. It has a viscosity of about 1400 centipoise as measured by a Brookfield viscometer at 60 rpm, and was pourable.

EXAMPLE 2

This example illustrates the production of a slurry RHA-LT. The RHA-LT was produced by burning raw rice hulls in a current of air at a temperature well below 700° C., using a 2-foot diameter by 24 foot long externally-heated steel-shelled rotary calciner. The resulting product was off-white in color, and had a BET specific surface area of about 150 sq.m./g, and a carbon content of less that 0.5%. This RHA-LT sample was ground in a 5-gallon steel ball mill, with a charge of 23.3 kg of steel balls (¼ and ⅜ inch), operating at 54 rpm. The mill was first charged with the steel balls plus 3200 grams of a 2% aqueous solution of sodium naphthalene sulfonate formaldehyde (Daxad-19), and then 3200 grams of the RHA-LT was added in small increments over a period of 1.3 hours. The mill was then operated for a further 29.5 hours, with samples being taken at intermediate times. These samples were subjected to particle size analysis using the laser-light scattering analyzer (Microtrac). Results are summarized in Table 1. The resulting slurries contained 50% RHA and 1% Daxad-19 by weight, and were all pourable liquids. The samples were stored and later observed as being a readily pourable liquid after brief agitation.

TABLE 1

| WET GRINDING OF RHA-LT SLURRIES | | |
|---|---|---|
| Sample | Grinding Time, hrs. | Vol. median diameter, um |
| E2-1 | 7.0 | 4.0 |
| E2-2 | 8.0 | 3.8 |
| E2-3 | 13.5 | 3.3 |
| E2-4 | 29.5 | 3.3 |

EXAMPLE 3

This example illustrates the formation of RHA product slurries using a stirred-media mill. Samples of RHA-PF and RHA-LT as described in Examples 1 and 2 above, respectively, were milled in a 30-gallon "Attritor" stirred media mill, as supplied by Union Process, Inc. The milling process was started by adding an aqueous solution of the indicated water reducing agent to the mill charge in the mill chamber, the mill charge consisting either of ¼ inch ceramic balls or ⅛ inch stainless steel balls. The mill stirrer motor was then started, and unground, dry RHA was fed in slowly at the top of the mill until the desired quantity had been added. The mill was allowed to run until the median particle diameter of the RHA in samples taken from the mill had reached the desired value, as determined by laser-light scattering (Microtrac) analysis, after which the slurry was discharged by pumping it out of the bottom of the mill chamber. Results of six such experiments are shown in Table 2. It is clear that both types of RHA can be ground to the desired particle size range of 4 um or less by this technique, and that median diameters as low as 1.1 um are achievable.

TABLE 2

| RHA Slurry Production with a Stirred Media Mill | | | |
|---|---|---|---|
| Code No. | Ingredients, (% by mass) RHA | Media Type* | Median Diam um |
| E3-1 | RHA-PF (52%); DX-19 (1%) | C | 4.0 |
| E3-2 | RHA-PF (52%); DX-19 (1%) | C | 2.9 |
| E3-3 | RHA-LT (50%); DX-19 (0.3%); DX-36 (0.3%) | C | 3.0 |
| E3-4 | RHA-PF (48%); DX-19 (2%) | C | 2.4 |
| E3-5 | RHA-LT (46%); DX-36 (0.3%) | S | 2.1 |
| E3-6 | RHA-PF (49%); DX-19 (2%) | S | 1.6 |
| E3-7 | RHA-PF (49%); DX-19 (1%) | S | 1.1 |

Notes:
*C = ¼ inch diameter ceramic balls
S = ⅛ inch diameter stainless steel balls
DX-19 = Daxad-19, (calcium neutralized NSFC, W. R. Grace & Co.)
DX-36 = Daxad-36, (sodium neutralized polyacrylic acid, W. R. Grace & Co.)

EXAMPLE 4

This example illustrates the manufacture of a hydraulic cement composition using RHA product prescribed by the present invention. A standard high-strength concrete mix was formulated, using a water/cement ratio of 0.35, and tested as-is or with a RHA product slurry, the actual slurry used being slurry E3-6, as described under Example 3. Full details of the cement compositions are given in Table 3. As indicated additional amount of water reducing agent was introduced one minute after mixing commenced to cause the slump of the samples to be approximately equal. D.C. resistivities were measured on 4 inch diameter by 8 inch long concrete cylinders, by applying 60 volts end to end, using a 3.0N sodium hydroxide solution as the contacting medium. The method is a modification of the Federal Highway Administration's Rapid Chloride Permeability Test (FHWA-Report No. RD-81/119 [1981]), and gives results which can be correlated with chloride impermeability, (i.e., a higher resistivity indicates less permeability to chloride ions). The formed hydraulic cement compositions having the subject RHA-product (E4-2 and E4-3) therein exhibited multifold resistance to allowing adverse chloride ions to permeate therein in comparison to the untreated comparative sample (E4-1).

For comparative purposes, a class F fly ash pozzolan was used in the same manner as above to produce a sample. The sample was formed to have about the same air and flow properties but the D.C. resistivity exhibited very little increase. Further, two samples were made in the same manner using RHA-PF material having vol. median diameters of 65 and 6 micrometers, respectively. These samples also showed very little benefit to the composition.

TABLE 4

EFFECT OF MICROSILICAS AND OTHER ADDITIVES ON MORTAR PROPERTIES

| Additive type | Vol. median Diameter, um | Fresh Mortar Air, % | Flow, % | 28-day Cured Mortar Resistivity, ohm-m |
|---|---|---|---|---|
| None (Avg. 3) | — | 7.3 | 92 | 36 |
| RHA-PF | 4.0 | 2.2 | 116 | 145 |
| RHA-PF | 2.7 | 4.0 | 120 | 188 |
| RHA-PF | 1.8 | 1.7 | 102 | 219 |
| RHA-PF | 1.1 | 1.3 | 89 | 272 |
| RHA-LT | 3.3 | 4.2 | 64 | 301 |
| RHA-LT | 2.1 | 3.1 | 60 | 368 |
| Class F Fly Ash* | | 3.0 | 126 | 41 |
| RHA-PF* | 65 | 4.3 | 50 | 49 |
| RHA-PF* | 6 | 2.4 | 107 | 78 |

*Comparative Examples.

TABLE 3

HIGH STRENGTH CONCRETES MADE WITH MICROSILICA SLURRIES

| | Fresh Concrete Mix Proportions. lb/cu.yd. | | | | | | Fresh concrete Properties | | | | Compressive Strength after moist curing for | | D.C. Resistivity after moist curing for 28 days, ohm-m |
|---|---|---|---|---|---|---|---|---|---|---|---|---|---|
| Mix Code | Cement | Sand | Gravel | Water | RHA Prod. | DX-19 | Air % | Slump in. | Final Set, hr | Density, lb/cu.ft. | 1 day, kpsi | 28 days, kpsi | |
| E4-1 | 744 | 1421 | 1707 | 260 | 0 | 10.2 | 2.2 | 6.5 | 8.8 | 153 | 3.6 | 8.2 | 81 |
| E4-2 | 730 | 1395 | 1675 | 256 | 55 | 8.2 | 2.6 | 5.0 | 5.7 | 152 | 4.7 | 10.5 | 280 |
| E4-3 | 740 | 1289 | 1696 | 259 | 111 | 12.0 | 2.5 | 4.5 | 7.5 | 152 | 4.8 | 12.0 | 530 |

EXAMPLE 5

This example illustrates the effect of RHA type and particle size on the resultant permeability properties of cement compositions made using the methods of the present invention. Mortar cement compositions were mixed in a Hobart mixer, using a Type 1 portland cement, a concrete sand at a sand/cement ratio of 2.5, and a water/cement ratio of 0.45, including water added with any admixtures. Rice hull ash product was added, in slurry form, as a direct volume for volume replacement for sand, at a total dosage rate of 10% by weight of cement. A total of 1% (solids basis, relative to cement,) of water reducing agent (Daxed 19) was included in each mix, some of it coming from the RHA product slurries and the rest added directly with the mix water. Mortar cubes and cylinders were cast and moist cured following ASTM C109 procedures, and tested for permeability by measuring D.C. resistivity of the cylinders after 28 days. Results are summarized in Table 4. All samples containing the RHA product slurries exhibited low permeability as measured by electrical resistivity, compared to the blank. Compressive strength (cubes) of the blank was 8.4 kpsi while those containing RHA-product were within the range of about 10-12 kpsi after 28 days of cure.

EXAMPLE 6

This example illustrates the ability to form aqueous slurries of RHA-product and calcium nitrite which are useful as cement admixtures. Samples of the formed slurry E3-4 described hereinabove were mixed with calcium nitrite in the amounts indicated in Table 5 below. The particle size of the RHA-product used was not altered by the required additional mixing to provide a substantially homogeneous composition. The pH of the samples was measured with a glass electrode immersed directly into the suspension. The samples were shaken and their ability to flow was observed. This visual observation is indicated in the Table 5.

TABLE 5

RHA-PRODUCT/CALCIUM NITRITE SLURRIES

| Sample | Ca(NO$_2$)$_2$ % of Slurry | Storage Days | Condition °C. | pH | Stability Fluidity |
|---|---|---|---|---|---|
| 1 | 0 | 84 | 23 | — | Stable; Fluid |
| 2 | 5 | 0 | 23 | 8.1 | Stable; Sl. Thicker than Sample 1 |
| 3 | 5 | 4 | 50 | 7.4 | Stable; Fluid |
| 4 | 5 | 23 | 23 | 7.4 | Stable; Fluid |
| 5 | 8 | 4 | 23 | 8.0 | Stable; Thick liquid |
| 6 | 8 | 7 | 50 | 7.7 | Stable; Thick liquid |
| 7 | 8 | 23 | 23 | 7.3 | Stable; Fluid |

What is claimed:

1. A product comprising rice hull ash having ultra-high fineness particle size of a volume-median particle diameter measured by laser-light scattering of up to about 4 micrometers, a BET specific surface area of at least 20 m$^1$/g, a silica content of at least 80% by weight, a carbon content of less than 10% by weight and being substantially amorphous as shown by x-ray diffractometry, said product being in combination with from about 0.05 to about 10 weight percent of a cement water reducing agent.

2. The product of claim 1 wherein the rice hull ash is RHA-PF product.

3. The product of claim 1 wherein the rice hull ash is RHA-LT product.

4. The product of claim 1 wherein the rice hull ash product has a silica content of at least 85% by weight.

5. The product of claim 2 wherein the particle size is up to about 3 micrometers.

6. The product of claim 3 wherein the particle size is less than 3 micrometers.

7. An aqueous suspension wherein the water reducing agent of the product of claim 1, 2, 3, 4, 5 or 6 is present in from about 0.01 to 10 percent by weight of the suspension and is selected from at least one of naphthalene-sulfonate formaldehyde condensates, melamine sulfonate formaldehyde condensates, lignin sulfonates, alkali or alkaline earth metal polyacrylates or copolymers thereof and said rice hull ash is present in from about 20 to 80 percent by weight of the suspension.

8. The aqueous suspension of claim 7 wherein the water reducing agent is present in from 0.1 to 5 percent by weight based on the total weight of the suspension.

9. The aqueous suspension of claim 7 wherein the rice hull ash product is present in from 40 to 60 percent by weight based on the total weight of the suspension.

10. An aqueous suspension comprising from about 0.01 to about 10 percent by weight of a water-reducing agent selected from at least one of naphthalene-sulfonate formaldehyde condensates, melamine sulfonate formaldehyde condensates, lignin sulfonates, alkali or alkaline earth metal polyacrylates or copolymers thereof; from about 40 to 60 weight percent of rice hull ash product composed of RHA-PF having a volume-median particle size of up to about 4 micrometers measured by laser-light scattering, a BET specific surface area of at least 20 m$^2$/g, a silica content of at least 80% by weight, a carbon content of less than 10% by weight and being substantially amorphous as shown by x-ray diffractometry; and up to about 15 wt. percent of calcium nitrite.

11. The suspension of claim 9 wherein the rice hull ash product has a particle size of up to about 3 micrometers.

12. The suspension of claim 9 wherein the water-reducing agent is a mixture of naphthalene sulfonate formaldehyde and a polyacrylate.

13. An hydraulic cement admixture comprising an aqueous suspension of claim 7.

14. An hydraulic cement admixture comprising an aqueous suspension of claim 9.

15. An hydraulic cement admixture comprising an aqueous suspension of claim 10.

16. An hydraulic cement admixture comprising an aqueous suspension of claim 11.

17. An hydraulic cement composition comprising a portland cement, sand, aggregate and water in proportions to provide a settable product, the improvement comprising the addition of from about 0.1 to 30 percent by weight solids of the admixture of claim 13 based on the dry weight of the portland cement.

18. An hydraulic cement composition comprising a portland cement, sand, aggregate and water in proportions to provide a settable product, the improvement comprising the addition of from about 0.1 to 30 percent by weight solids of the admixture of claim 14 based on the dry weight of the portland cement.

19. An hydraulic cement composition comprising a portland cement, sand, aggregate and water in proportions to provide a settable product, the improvement comprising the addition of from about 0.1 to 30 percent by weight of the admixture of claim 15 based on the dry weight of the portland cement.

20. An hydraulic cement composition comprising a portland cement, sand, aggregate and water in proportions to provide a settable product, the improvement comprising the addition of from about 0.1 to 30 percent by weight of the admixture of claim 16 based on the dry weight of the portland cement.

* * * * *